(12) United States Patent
Kim et al.

(10) Patent No.: US 12,322,808 B2
(45) Date of Patent: *Jun. 3, 2025

(54) CONDUCTIVE AGENT, ELECTRODE INCLUDING THE CONDUCTIVE AGENT, AND SECONDARY BATTERY INCLUDING THE ELECTRODE

(71) Applicant: LG Energy Solution, Ltd., Seoul (KR)

(72) Inventors: Tae Gon Kim, Daejeon (KR); Sin Young Park, Daejeon (KR); Bo Ram Lee, Daejeon (KR); Seul Ki Kim, Daejeon (KR); Tae Gu Yoo, Daejeon (KR); Min Kwak, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 763 days.

This patent is subject to a terminal disclaimer.

(21) Appl. No.: 17/604,577

(22) PCT Filed: May 12, 2020

(86) PCT No.: PCT/KR2020/006230
§ 371 (c)(1),
(2) Date: Oct. 18, 2021

(87) PCT Pub. No.: WO2020/231150
PCT Pub. Date: Nov. 19, 2020

(65) Prior Publication Data
US 2022/0200005 A1    Jun. 23, 2022

(30) Foreign Application Priority Data

May 15, 2019    (KR) .......................... 10-2019-0056920

(51) Int. Cl.
*H01M 4/62*       (2006.01)

(52) U.S. Cl.
CPC ................................. *H01M 4/625* (2013.01)

(58) Field of Classification Search
CPC ....................................................... H01M 4/625
See application file for complete search history.

(56) References Cited

U.S. PATENT DOCUMENTS

| | | |
|---|---|---|
| 2011/0159372 A1 | 6/2011 | Zhamu et al. |
| 2014/0147648 A1 | 5/2014 | Zhamu et al. |

(Continued)

FOREIGN PATENT DOCUMENTS

| | | |
|---|---|---|
| CN | 107919469 A | 4/2018 |
| JP | 2007137980 A | 6/2007 |

(Continued)

OTHER PUBLICATIONS

International Search Report for Application No. PCT/KR2020/006230, dated Aug. 24, 2020, 2 pages.

(Continued)

*Primary Examiner* — Brittany L Raymond
(74) *Attorney, Agent, or Firm* — Lerner David LLP

(57) ABSTRACT

A conductive agent includes a first particle and a second particle, wherein the first particle includes a secondary particle structure in which graphene sheets are connected to each other, the first particle includes a plurality of graphene sheets arranged in different directions, and the second particle is a carbon nanotube. An electrode including the conductive agent, and a secondary battery including the electrode are also provided.

12 Claims, 7 Drawing Sheets

(56) References Cited

U.S. PATENT DOCUMENTS

| | | | |
|---|---|---|---|
| 2014/0332731 A1 | 11/2014 | Ma et al. | |
| 2014/0356722 A1 | 12/2014 | Shin et al. | |
| 2016/0285084 A1* | 9/2016 | Fang | H01M 4/0426 |
| 2016/0380270 A1 | 12/2016 | Lee et al. | |
| 2017/0073834 A1 | 3/2017 | Zhamu et al. | |
| 2017/0117539 A1* | 4/2017 | Ogata | H01M 4/0419 |
| 2018/0083272 A1* | 3/2018 | Son | H01M 4/133 |
| 2018/0135200 A1 | 5/2018 | Zhamu et al. | |
| 2018/0269467 A1 | 9/2018 | Sonoda et al. | |
| 2020/0335794 A1* | 10/2020 | Kim | H01B 1/04 |

FOREIGN PATENT DOCUMENTS

| | | | |
|---|---|---|---|
| JP | 2007242386 A | | 9/2007 |
| JP | 2014103030 A | | 6/2014 |
| JP | 2018045820 A | | 3/2018 |
| KR | 20120114317 A | | 10/2012 |
| KR | 20140023858 A | | 2/2014 |
| KR | 20140140981 A | | 12/2014 |
| KR | 20150077321 A | | 7/2015 |
| KR | 20150089028 A | | 8/2015 |
| KR | 20170088410 A | | 8/2017 |
| KR | 20170127240 A | | 11/2017 |
| KR | 2018-0129348 | * | 12/2018 |
| KR | 20180129348 A | | 12/2018 |
| KR | 101937900 | * | 1/2019 |
| KR | 101937900 B1 | | 1/2019 |
| WO | 2018110776 A1 | | 6/2018 |

OTHER PUBLICATIONS

Byeongyong Lee et al., "Hierarchical networks of redox-active reduced crumpled graphene oxide and functionalized few-walled carbon nanotubes for rapid electrochemical energy storage", Nanoscale, vol. 8, No. 24, May 25, 2016, pp. 12330-12338, XP055367663, United Kingdom, ISSN: 2040-3364, DOI: 10.1039/C6NR02013E.

Dong Young Kim et al., "Sub-millimeter-long carbon nanotubes repeatedly grown on and separated from ceramic beads in a single fluidized bed reactor", Carbon, Elsevier Oxford, GB, vol. 49, No. 6, Jan. 12, 2011, pp. 1972-1979, XP028153263, ISSN: 0008-6223, DOI: 10.1016/J.CARBON.2011.01.022.

Extended European Search Report for Application No. 20806155.6 dated Apr. 28, 2022. 9 pgs.

Search Report dated May 29, 2024 from Office Action for Chinese Application No. 202080031595.0 issued May 31, 2024. 3 pgs.

* cited by examiner

CONDUCTIVE AGENT, ELECTRODE INCLUDING THE CONDUCTIVE AGENT, AND SECONDARY BATTERY INCLUDING THE ELECTRODE

CROSS-REFERENCE TO RELATED APPLICATIONS

This application is a national phase entry under 35 U.S.C. § 371 of International Application No. PCT/KR2020/006230, filed on May 12, 2020, which claims priority from Korean Patent Application No. 10-2019-0056920, filed on May 15, 2019, the disclosures of which are incorporated by reference herein.

TECHNICAL FIELD

The present invention relates to a conductive agent, an electrode including the conductive agent, and a secondary battery including the electrode. Specifically, the conductive agent includes a first particle and a second particle, wherein the first particle includes a secondary particle structure in which graphene sheets are connected to each other, the graphene sheets include a plurality of graphene sheets arranged in different directions, and the second particle is a carbon nanotube.

BACKGROUND ART

Demand for batteries as an energy source has been significantly increased as technology development and demand with respect to mobile devices have recently increased, and a variety of researches on batteries capable of meeting various needs have been carried out accordingly. Particularly, as a power source for such devices, research into lithium secondary batteries having excellent lifetime and cycle characteristics as well as high energy density has been actively conducted.

A lithium secondary battery denotes a battery in which a non-aqueous electrolyte containing lithium ions is included in an electrode assembly which includes a positive electrode including a positive electrode active material capable of intercalating/deintercalating the lithium ions, a negative electrode including a negative electrode active material capable of intercalating/deintercalating the lithium ions, and a microporous separator disposed between the positive electrode and the negative electrode.

The positive electrode and/or the negative electrode may include a conductive agent to improve conductivity. Typically, a point-type conductive agent, such as carbon black, has mainly been used, and a line-type conductive agent, such as a carbon nanotube, is being studied in order to further improve the conductivity.

However, with respect to the carbon nanotube, electrical conductivity is excellent, but dispersion does not easily occur in a slurry for forming an electrode due to the nature of the material growing in a bundle type and/or an entangled type, and, accordingly, a problem occurs in which resistance in the electrode is not uniform. In order to solve the dispersibility problem, a functional group may be introduced to the line-type conductive agent, but, since this causes a side reaction on a surface of the conductive agent, actual mass production and application are difficult. Also, since a point contact is a main contact method between the carbon nanotubes in the electrode, there is a limitation in improving the conductivity.

To improve this, the carbon nanotubes and graphene, which is a plane-type conductive agent, may be used together, and, in this case, a line contact between the carbon nanotube and the graphene increases. However, when graphene is prepared by peeling graphite, it is not easy to prepare thin graphene, and, in a case in which thick graphene is used, battery efficiency is significantly reduced due to a decrease in conductive path. Also, even if thin graphene is used, since an area of typical graphene is excessively large, diffusion of lithium ions is inhibited to reduce output characteristics. Furthermore, since the graphene has a planar shape, carbons of the carbon nanotube and carbons of the graphene tend to have sp2 bonds with adjacent carbons. Accordingly, a π-π bond may be easily formed between a surface of the carbon nanotube and a surface of the graphene, and, since most of the carbon nanotubes to be connected to a surface of the electrode active material are easily aggregated on the surface, especially a basal plane, of the graphene, there is a problem that conductivity in the electrode is reduced. Furthermore, since a single graphene present in the electrode has only one plane direction, there is a problem that the conductivity is further reduced because directionality of the carbon nanotubes bonded to the graphene is limited.

Thus, there is a need for a conductive agent which does not inhibit the diffusion of lithium ions and may minimize the aggregation of carbon nanotubes while increasing a contact between conductive agent particles.

DISCLOSURE OF THE INVENTION

Technical Problem

An aspect of the present invention provides a conductive agent, which may ensure conductivity between electrode active material particles, does not inhibit diffusion of lithium ions, and may minimize aggregation of carbon nanotubes while increasing a contact between conductive agent particles, an electrode including the conductive agent, and a secondary battery including the electrode.

Technical Solution

According to an aspect of the present invention, there is provided a conductive agent including a first particle and a second particle, wherein the first particle includes a secondary particle structure in which graphene sheets are connected to each other, the first particle includes a plurality of graphene sheets arranged in different directions, and the second particle is a carbon nanotube.

According to another aspect of the present invention, there is provided an electrode including the conductive agent.

According to another aspect of the present invention, there is provided a secondary battery including the electrode.

Advantageous Effects

According to an aspect of the present invention, a first particle, which includes a secondary particle structure, in which a plurality of graphene sheets are connected to each other to be in the form of a chain, and has a high dispersion level due to a high oxygen content, and a second particle including carbon nanotubes are used in combination as a conductive agent. Accordingly, since a conductive contact in an electrode is improved by a composite application of two different types, such as a plane-type (first particle) and a line-type (second particle), of the conductive agents, conductivity in the electrode may be improved. Furthermore, since the first particle includes graphene sheets with a short length which are different from typical graphene, the first particle does not interfere with a direct connection between the carbon nanotubes and an electrode active material. Also, since the first particle exists in the form of a chain (three-dimensional shape rather than a planar shape) and the graphene sheets of the first particle are randomly arranged, a degree of diffusion of lithium ions in the electrode may be improved. Furthermore, since the first particle has a high oxygen content, aggregation of the first particles and/or the second particles is prevented by a repulsive force caused by an unshared electron pair contained in a functional group containing oxygen, and thus, the first particles and the second particles may be effectively dispersed and present in the electrode. Accordingly, the conductivity of the electrode may be more improved, and this may lead to an improvement in high-rate discharge capacity of a battery. Furthermore, since the graphene sheets of the first particle have various directionalities, the carbon nanotubes bonded to the graphene sheets may be arranged in various directions. Therefore, since the graphene sheets of the first particle act as a kind of hub, a conductive network according to the composite application with the carbon nanotubes may be efficiently formed and the conductivity of the electrode may be further improved.

MODE FOR CARRYING OUT THE INVENTION

Figure 1:
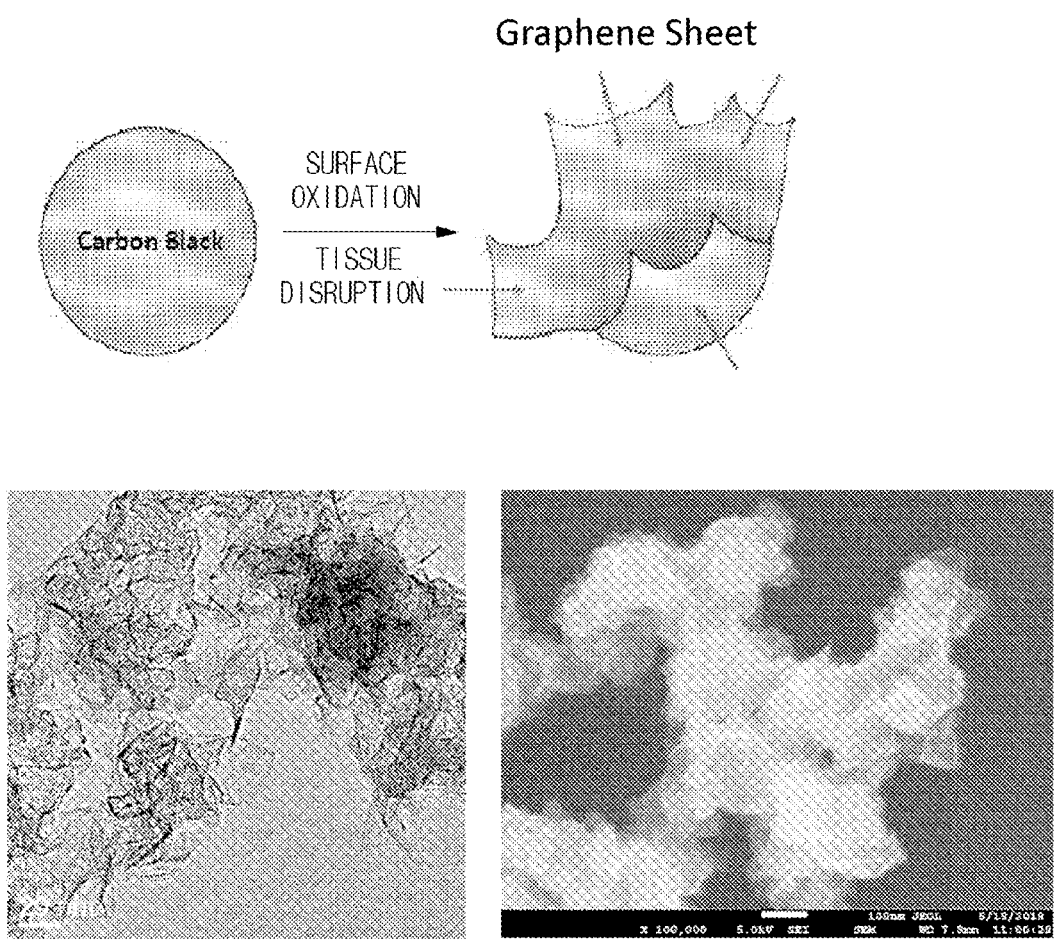
FIG. 1 is a schematic view illustrating a process of forming graphene sheets included in a first particle of a conductive agent of the present invention, a transmission electron microscope (TEM) image, and a scanning electron microscope (SEM) image.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

In the present invention, the expression "graphene sheet" means that, as a carbonaceous structure having a thickness of 10 nm or less, flexibility, and a thin film form, the graphene sheet exists in the form of being included in a first particle. In contrast, the expression "graphene sheet" used in Comparative Example means a carbonaceous structure which is not included in the first particle and exists as a single particle in the form of a thin film.

In the present invention, an oxygen content may be measured by carbon (C), hydrogen (H), oxygen (O), and nitrogen (N) elemental analysis, and may be measured using an elemental analyzer (CHN-coder MT-5, Yanako).

In the present specification, an average particle diameter ($D_{50}$) may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm and may obtain highly repeatable and high-resolution results.

<Conductive Agent>

A conductive agent according to an embodiment of the present invention includes a first particle and a second particle, wherein the first particle includes a secondary particle structure in which graphene sheets are connected to each other, the first particle includes a plurality of graphene sheets arranged in different directions, and the second particle may be a carbon nanotube.

The conductive agent may include a first particle and a second particle.

(1) First Particle

The first particle may include a structure in which a plurality of graphene sheets are connected. Specifically, in the first particle, at least two graphene sheets may be directly connected to each other or may be indirectly connected.

The first particle may be in the form of a secondary particle which is formed by the connection of the plurality of graphene sheets. Specifically, the plurality of graphene sheets may be interconnected to form a secondary particle in the form of a long chain, and, more specifically, the secondary particle in the form of a chain may partially include an aggregated region of the plurality of graphene sheets. Since the secondary particle has a unique connection structure in the form of a chain, electrical conductivity and thermal conductivity of the conductive agent including the first particle may be excellent.

When described in more detail, typical planar graphenes have a two-dimensional arrangement due to a small thickness compared to a width of the plane. Accordingly, most of conductive networks formed in an electrode are formed based on the two-dimensional arrangement. In contrast, the graphene sheets included in the first particle include a plurality of graphene sheets having a random arrangement. Specifically, the graphene sheets included in the first particle include a plurality of graphene sheets having different directions (directions perpendicular to the planes of the graphene sheets). That is, the first particle may be in the form of a secondary particle having a three-dimensional arrangement which is formed by connecting graphene sheets arranged in various directions to each other, and, more specifically, since the graphene sheets are in the form of a chain that is arranged lengthways to have a predetermined length while having the three-dimensional arrangement, the conductive network formed in the electrode may be formed based on the three-dimensional arrangement. Accordingly, since the conductive networks in various directions may be formed and conductive connection between the linear second particle and the first particle may be effectively made, conductivity in the electrode may be significantly improved. Particularly, in view of the combined use with carbon nanotubes to be described later, since the graphene sheets of the first particle have various directionalities, the carbon nanotubes connected to the graphene sheets may also exist in various directions in the electrode. Accordingly, the conductive network in the electrode may be more effectively formed. Herein, the first particle may also include a plurality of graphene sheets arranged in the same direction, but, in such a case, the first particle also includes a plurality of graphene sheets arranged in different directions.

The first particle may further include a connection portion connected to at least a part of the graphene sheets of the plurality of graphene sheets. In the present invention, during the preparation of the first particles, preliminary first particles, such as carbon black, are ruptured by continuous oxidation to form the graphene sheets and a portion retaining its original shape without being ruptured may also be present. In this case, the portion retaining its shape may correspond to the connection portion. Thus, the connection portion may have a non-graphene shape, and the expression "non-graphene shape", different from the above-described graphene sheet, may denote a lump shape having a thickness greater than the graphene sheet, and may more specifically be in the shape of a lump that is not completely ruptured.

A portion of each of the plurality of graphene sheets may be directly connected to each other. Alternatively, at least a portion of the graphene sheets of the plurality of graphene sheets may be connected to each other through the connection portion, and, specifically, at least a portion of each of the plurality of graphene sheets may be connected to the connection portion. The first particle of the present invention may include both of the two connection methods.

The first particle may be formed by modification of carbon black in the form of a near-spherical particle, for example, acetylene black, furnace black, thermal black, channel black, and lamp black, by an oxidation treatment. Referring to a schematic view of FIG. 1, a structure of carbon black may be modified by an oxidation treatment to form a particle including a plurality of graphene sheets. In a case in which the carbon black is in the form of a secondary particle, a first particle in the form of a secondary particle, in which particles including the plurality of graphene sheets are aggregated, may be formed.

The graphene sheet may have an average thickness of nm or less, particularly 0.34 nm to 10 nm, and more particularly 0.34 nm to 5 nm. In a case in which the average thickness of the graphene sheet satisfies the above range, since flexibility that is unique to the graphene sheet may be expressed, a surface contact due to the graphene sheet is improved, and thus, electrical conductivity of the conductive agent may be excellent. The graphene sheet may have a shape in which 30 or less graphene layers are stacked. An average thickness of the graphene sheets may correspond to an average value of thicknesses of 100 graphene sheets which are measured by identifying the electrode through a transmission electron microscope (TEM).

The graphene sheet may have a lateral size of 200 nm or less, particularly 10 nm to 200 nm or less, and more particularly 10 nm to 100 nm, for example, 50 nm to 90 nm. The lateral size of the graphene sheet may be controlled depending on a degree of heat treatment, and, for example, the lateral size of the graphene sheet may be controlled by further performing an additional heat treatment in an inert atmosphere after the oxidation treatment. In a case in which the lateral size of the graphene sheet satisfies the above range, ions in an electrolyte solution may smoothly diffuse in the electrode. Thus, rapid charging characteristics of a battery may be improved and rate capability may be improved. The lateral size of the graphene sheet denotes an average of lateral sizes of 100 graphene sheets observed by a scanning electron microscope (SEM) or TEM, and, herein, the expression "lateral size" denotes the longest length when assuming a line from one point to another point in one graphene sheet.

The lateral size of the graphene sheet is much smaller than that of typical graphene. Typically, with respect to graphene having a large lateral size which is used as a conductive agent, since the graphene excessive covers a surface of an electrode active material, a direct contact between the carbon nanotubes and the electrode active material is interrupted. In contrast, since the graphene sheet of the present invention has a small lateral size, it does not interfere with the direct contact between the carbon nanotubes and the electrode active material, and thus, it is effective in reducing resistance of the electrode. These characteristics show that the typical graphene and the first particle of the present invention form the conductive networks using completely different mechanisms, and mean that the typical graphene and the first particle of the present invention are completely different materials.

The first particle may have an oxygen content of 1 wt % or more, for example, 1 wt % to 10 wt % based on a total weight of the first particle. In a case in which the oxygen content of the first particle satisfies the above range, since the first particles may be smoothly dispersed in an electrode slurry formed during the preparation of the electrode, conductivity of the electrode may be improved and capacity of the battery prepared may be improved. The oxygen content may be measured by carbon (C), hydrogen (H), oxygen (O), and nitrogen (N) elemental analysis.

The oxygen content may be achieved during the oxidation treatment of the carbon black. Specifically, an oxygen-containing functional group may be formed on a surface of the first particle by the oxidation treatment. The oxygen-containing functional group may be at least one selected from the group consisting of a carboxyl group, a hydroxy group, and a carbonyl group. After the oxidation treatment, the oxygen content may be further controlled by performing a heat treatment on the first particles in an inert atmosphere.

The first particle may have a higher degree of graphitization than the carbon black before the oxidation treatment. Specifically, since high structural stress caused by surface tension of the spherical carbon black may be partially eliminated due to the formation of the planar graphene sheets and structural defects caused by a curvature may be minimized to form a stable $sp^2$ structure, the degree of graphitization of the prepared conductive agent may be increased.

The first particle may have a D/G peak ratio of 2.0 or less, particularly 0.9 to 2.0, and more particularly 1.1 to 1.8 during Raman spectrum measurement. In the Raman spectrum, a G peak near 1590 $cm^{-1}$ is due to $E_{2g}$ vibration mode of $sp^2$ bonds of carbon, and a D peak near 1350 $cm^{-1}$ appears when there is a defect in the $sp^2$ bonds of carbon. That is, in a case in which the D/G peak ratio is satisfied, it denotes that a high degree of graphitization may be obtained, and, accordingly, when the first particle is used, capacity and electrical characteristics of the battery may be improved due to the high electrical conductivity of the first particle.

The first particle may have a value calculated by the following Equation 1 of 0.2 or less, particularly 0 to 0.20, and more particularly 0 to 0.15, for example, 0 to 0.1.

$$\frac{|b-a|}{a} \qquad \text{[Equation 1]}$$

In Equation 1, a is a specific surface area ($m^2/g$) of the first particle which is measured by a nitrogen adsorption Brunauer-Emmett-Teller (BET) method, and b is an iodine adsorption value (mg/g) of the first particle. In a case in which the first particle includes a pore structure in the inside thereof or between the particles, small-sized nitrogen ($N_2$) molecules may be adsorbed a lot in the pores. In contrast, since iodine ($I_2$), as a relatively larger molecule, is difficult to enter into the pores in comparison to the nitrogen, the iodine adsorption value is not large. That is, when the pore structure is present, the value according to Equation 1 is increased. In other words, in the first particle, that the value according to Equation 1 is 0.2 or less means that the first particle does not include micropores or includes a small amount of the micropores. That is, in a case in which there are no micropores, since a degree of adsorption of iodine and a degree of adsorption of nitrogen are similar to each other, the value of Formula 1 is decreased. This means that the surface of the first particle is a free surface. Specifically, most of the carbon black is modified into a hollow structure by the oxidation treatment, and the structure is broken by the continuous oxidation treatment to form graphene sheets. In this case, the graphene sheets may be formed to open outward without forming the pore structure.

The first particle may have a specific surface area ($m^2/g$) measured by a nitrogen adsorption BET method of 200 $m^2/g$ or more, particularly 200 $m^2/g$ to 1,100 $m^2/g$, and more particularly 300 $m^2/g$ to 1,100 $m^2/g$, for example, 500 $m^2/g$ to 900 $m^2/g$. In a case in which the above specific surface area range is satisfied, it means that an area of the graphene sheets in the first particle is large, and, accordingly, the conductivity of the electrode may be ensured even if an amount of the first particles in the electrode is small.

The first particle may have an average particle diameter ($D_{50}$) of 0.5 μm to 2.5 μm, particularly 0.7 μm to 2.3 μm, and more particularly 0.9 μm to 2.1 μm. In a case in which the above range is satisfied, since the first particle acts as a hub of the conductive network in the electrode, electrons may be uniformly distributed in the electrode.

(2) Second Particle

The second particle may be a carbon nanotube. If only the first particles are used, since viscosity of the electrode slurry is excessively increased due to the excessively high specific surface area and oxygen content, processability during the preparation of the electrode is reduced. Also, since the conductive agent is mostly composed of the planar graphene sheets, the diffusion of lithium ions is hardly improved. In contrast, in a case in which the carbon nanotubes are used as a second particle in combination with the first particle, since overall specific surface area and oxygen content of the conductive agent are maintained at an appropriate level, the processability may be improved. Also, since the planar graphene sheets and the linear carbon nanotubes may more effectively form the conductive network in the electrode, the diffusion of the lithium ions is improved and rate capability and life characteristics of the battery may be improved.

A graphite sheet of the carbon nanotube has a cylindrical shape with a nano-sized diameter and has an $sp^2$ bond structure. In this case, the carbon nanotube may exhibit characteristics of a conductor or semiconductor depending on a structure and an angle at which the graphite sheet is rolled. The carbon nanotube may be classified into a single-walled carbon nanotube (SWCNT) unit, a double-walled carbon nanotube (DWCNT) unit, and a multi-walled carbon nanotube (MWCNT) unit depending on the number of bonds forming the wall.

The carbon nanotube may be a multi-walled carbon nanotube. In a case in which the carbon nanotube is a single-walled carbon nanotube or a double-walled carbon nanotube, since battery manufacturing costs are excessively high and the carbon nanotube unit is present in an excessively aggregated state in the electrode, the conductivity may be reduced. In contrast, in a case in which the carbon nanotube is a multi-walled carbon nanotube, since a manufacturing price is relatively low and dispersion in the electrode slurry is easy, it may be uniformly distributed in the electrode. Accordingly, the rate capability and life characteristics of the battery may be improved.

The carbon nanotube may have an average diameter of 1 nm to 200 nm, particularly 5 nm to 100 nm, and more particularly 5 nm to 50 nm. In a case in which the average diameter of the carbon nanotube satisfies the above range, the carbon nanotubes may be easily dispersed in the slurry for forming an electrode, and the conductivity of the electrode may be improved. The average diameter may be confirmed by a method of obtaining an average of diameters of 100 carbon nanotubes in the electrode which are observed by an SEM or TEM.

The carbon nanotubes may have a Brunauer-Emmett-Teller (BET) specific surface area of 50 $m^2/g$ to 500 $m^2/g$, particularly 100 $m^2/g$ to 400 $m^2/g$, and more particularly 150 $m^2/g$ to 300 $m^2/g$. In a case in which the BET specific surface area of the carbon nanotubes satisfies the above range, proper dispersion of the carbon nanotubes may be possible to maintain manufacturing processability, and the formation of the conductive network may be maximized even with a small amount of the conductive agent. The BET specific surface area may be measured by a nitrogen adsorption BET method.

The carbon nanotube may have an average length of 0.1 μm to 100 μm, particularly 0.5 μm to 50 μm, and more particularly 1 μm to 20 μm. The proper dispersion of the carbon nanotubes may be possible and the use of the electrode slurry having a high solid content during the preparation of the electrode may be possible to maintain the manufacturing processability. Also, the formation of the conductive network may be maximized even with the small amount of the conductive agent. The average length may be confirmed by a method of obtaining an average of lengths of 100 carbon nanotubes in the electrode which are observed by an SEM or TEM.

A weight ratio of the first particles to the second particles may be in a range of 1:9 to 9:1, particularly 2:8 to 5:5, and more particularly 3:7 to 4:6. In a case in which the above range is satisfied, proper dispersion of the first particles and the second particles may be possible and the use of the electrode slurry having a high solid content during the preparation of the electrode may be possible to maintain the manufacturing processability. Also, the formation of the conductive network may be maximized even with the small amount of the conductive agent. Accordingly, the rate capability and life characteristics of the battery may be improved.

<Electrode>

An electrode according to another embodiment of the present invention may include the conductive agent of the above-described embodiment. The electrode may be a positive electrode or a negative electrode. The electrode may include a current collector and an active material layer which is disposed on the current collector.

The conductive agent may be included in an amount of 0.1 wt % to 3.0 wt %, for example, 0.5 wt % to 2.0 wt % in the active material layer. This corresponds to a level lower than an amount of a typical conductive agent. That is, it means that sufficient conductivity may be ensured even with a small amount when using the conductive agent according to the embodiment of the present invention.

The positive electrode may include a current collector and a positive electrode active material layer which is disposed on the current collector and includes a positive electrode active material. The negative electrode may include a current collector and a negative electrode active material layer which is disposed on the current collector and includes a negative electrode active material. Furthermore, the positive electrode active material layer and the negative electrode active material layer may each further include a binder.

The current collector is not particularly limited as long as it has conductivity without causing adverse chemical changes in the battery. For example, copper, stainless steel, aluminum, nickel, titanium, fired carbon, or aluminum or stainless steel that is surface-treated with one of carbon, nickel, titanium, or silver may be used as the current collector. Specifically, a transition metal that adsorbs carbon well, such as copper and nickel, may be used as the current collector. The positive electrode active material layer or the negative electrode active material layer may each be disposed on one surface or both surfaces of the current collector.

The positive electrode active material may be a positive electrode active material commonly used. Specifically, the positive electrode active material may include a layered compound, such as lithium cobalt oxide ($LiCoO_2$) or lithium nickel oxide ($LiNiO_2$), or a compound substituted with one or more transition metals; lithium manganese oxides such as $Li_{1+y1}Mn_{2-y1}O_4$ ($0 \leq y1 \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; nickel (Ni)-site type lithium nickel oxide expressed by a chemical formula of $LiNi_{1-y2}M1_{y2}O_2$ (where M1 is cobalt (Co), manganese (Mn), aluminum (Al), copper (Cu), iron (Fe), magnesium (Mg), boron (B), or gallium (Ga), and y2 satisfies $0.01 \leq y2 \leq 0.3$); lithium manganese composite oxide expressed by a chemical formula of $LiMn_{2-y3}M2_{y3}O_2$ (where M2 is Co, Ni, Fe, chromium (Cr), zinc (Zn), or tantalum (Ta), and y3 satisfies $0.01 \leq y3 \leq 0.1$) or $Li_2Mn_3M3O_8$ (where M3 is Fe, Co, Ni, Cu, or Zn); and $LiMn_2O_4$ having a part of Li being substituted with alkaline earth metal ions, but the positive electrode active material is not limited thereto.

The negative electrode active material may include graphite-based active material particles or silicon-based active material particles. At least one selected from the group consisting of artificial graphite, natural graphite, graphitized carbon fibers, and graphitized mesocarbon microbeads may be used as the graphite-based active material particles, and rate capability may be improved particularly when the artificial graphite is used. At least one selected from the group consisting of silicon (Si), $SiO_x$ ($0<x<2$), a Si—C composite, and a Si—Y alloy (where Y is an element selected from the group consisting of alkali metal, alkaline earth metal, transition metal, a Group 13 element, a Group 14 element, a rare earth element, and a combination thereof) may be used as the silicon-based active material particles, and high capacity of the battery may be obtained particularly when Si is used.

The binder may include at least one selected from the group consisting of a polyvinylidene fluoride-hexafluoropropylene copolymer (PVDF-co-HFP), polyvinylidene fluoride (PVdF), polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly acrylic acid, and a material having hydrogen thereof substituted with lithium (Li), sodium (Na), or calcium (Ca), or may include various copolymers thereof.

<Secondary Battery>

A secondary battery according to another embodiment of the present invention includes a negative electrode, a positive electrode, a separator disposed between the positive electrode and the negative electrode, and an electrolyte, wherein at least one of the positive electrode and the negative electrode may be the above-described electrode of the another embodiment.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate, may be used.

Particularly, among the carbonate-based organic solvents, since ethylene carbonate and propylene carbonate, as cyclic carbonate, well dissociate a lithium salt due to high permittivity as a highly viscous organic solvent, the cyclic carbonate may be preferably used. Since an electrolyte having high electrical conductivity may be prepared when the above cyclic carbonate is mixed with low viscosity, low permittivity linear carbonate, such as dimethyl carbonate and diethyl carbonate, in an appropriate ratio and used, the cyclic carbonate may be more preferably used.

A lithium salt may be used as the metal salt, and the lithium salt is a material that is readily soluble in the non-aqueous electrolyte solution, wherein, for example, one selected from the group consisting of $F^-$, $Cl^-$, $I^-$, $NO_3^-$, $N(ON)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the electrolyte components.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

<Method of Preparing Conductive Agent>

A method of preparing a conductive agent according to another embodiment of the present invention includes: preparing first particles; and mixing the first particles and second particles, wherein the preparing of the first particles includes preparing preliminary first particles; and modifying the preliminary first particles by an oxidation treatment, wherein the modifying of the preliminary first particles by the oxidation treatment includes at least one of a) performing a first heat treatment of the preliminary first particles at a temperature of 200° C. to 800° C. in an oxygen atmosphere or an air atmosphere; and b) reacting the preliminary first particles with an acidic vapor at 120° C. to 300° C., and the second particles may be carbon nanotubes.

In the preparing of the preliminary first particles, the preliminary first particles may be carbon black. Specifically, the preliminary first particles may include at least one selected from the group consisting of acetylene black, furnace black, thermal black, channel black, and lamp black. More specifically, the preliminary first particles may be acetylene black which is produced at the highest temperature to basically have an excellent degree of graphitization.

The preparing of the preliminary first particles may include pyrolysis of acetylene gas, and carbon black, for example, acetylene black may be formed by the pyrolysis. The acetylene gas may be high purity acetylene gas, and may specifically be acetylene gas with a purity of 95% or more, for example, 98% or more.

The pyrolysis of the acetylene gas may be performed at a temperature of 1,500° C. or more, particularly 1,500° C. to 2,200° C., and more particularly 1,500° C. to 2,000° C. In a case in which the temperature satisfies the above range, a degree of graphitization of the prepared preliminary first particles may be high, and a degree of graphitization of the first particles thus prepared may also be high. Thus, the electrical conductivity of the conductive agent may be improved.

The preliminary first particles may be carbon black, but, among them, acetylene black may be preferred in terms of the following aspect. The graphene sheets, which are included in the conductive agent of the present invention, may be formed by modification of surfaces of the preliminary first particles by an oxidation treatment. A surface of the acetylene black formed by the pyrolysis may have a high degree of graphitization. Thus, a structure of graphene sheet may be smoothly formed when the acetylene black is subjected to the oxidation treatment in comparison to a case where other carbon blacks inevitably including some oxygen functional groups on surfaces thereof are subject to the oxidation treatment.

The pyrolysis may be performed in such a manner that, after an internal temperature of a reaction furnace is adjusted to the above temperature range, acetylene gas is introduced into the reaction furnace and the pyrolysis is instantaneously performed. Also, in the process, air, oxygen, and $H_2O$ may be further added to control density of the conductive agent and an oxygen functional group, and a connection structure in the conductive agent may be controlled.

The modifying of the preliminary first particles by the oxidation treatment may include at least one of a) performing a first heat treatment of the preliminary first particles at a temperature of 200° C. to 800° C. in an oxygen atmosphere or an air atmosphere (step a); and b) reacting the preliminary first particles with an acidic vapor at 120° C. to 300° C. (step b).

In step a, the oxygen atmosphere or the air atmosphere may be formed by introducing oxygen or air into the reaction furnace containing the preliminary first particles. Specifically, the graphene sheet structure may be formed by an oxidation process in the reaction furnace according to the settings of appropriate flow amount and rate of oxygen or air, reaction temperature, and reaction time during the first heat treatment. Also, conditions of the oxidation process may vary depending on differences in density of the preliminary first particles and an amount of the oxygen functional group.

In step a, the first heat treatment may be performed by controlling a temperature of the reaction furnace in the reaction furnace containing the preliminary first particles. The first heat treatment may be performed at a heat treatment temperature of 200° C. to 800° C., and may specifically be performed at a heat treatment temperature of 200° C. to 450° C. In a case in which the heat treatment temperature satisfies the above range, excessively rapid oxidation of the preliminary first particles may be prevented, and a graphene sheet having a desired size may be formed. The first heat treatment may be performed for 1 hour to 50 hours.

In step b, the preliminary first particles may react with an acidic vapor to be oxidized to form graphene sheets. Specifically, the acidic vapor may be a vapor derived from an acidic solution such as HCl and $HNO_3$. A temperature of the acidic vapor reacting with the preliminary first particles may be in a range of 120° C. to 300° C.

After the modifying of the preliminary first particles by the oxidation treatment, a second heat treatment process in an inert atmosphere may be further performed to increase the size of the graphene sheet formed. Specifically, the method of preparing a conductive agent may further include performing a second heat treatment of the preliminary first particles modified by the oxidation treatment at a temperature of 500° C. or more in an inert atmosphere, after the modifying of the preliminary first particles by the oxidation treatment. In this case, the inert atmosphere may be formed by vacuum or any one gas selected from the group consisting of helium, argon, and nitrogen. The second heat treatment temperature may be 500° C. or more, particularly 500° C. to 2,800° C., and more particularly 600° C. to 1,600° C.

A mechanism of forming the first particles described in the present invention may be as follows. During the preparation of the first particles, an oxidation treatment is performed on spherical or chain-type carbon black, in which spherical primary particles have an average diameter of 50 nm or less and the primary particles share the structure, for example, acetylene black under specific conditions. In this case, penetration and oxidation reaction of an oxidizing agent, such as oxygen and acidic vapor, occur from a defect portion such as a grain boundary or a dislocation present in a unit microstructure of the carbon black. When the oxidation treatment is performed for a predetermined time in the temperature range described in the preparation method, the oxidizing agent penetrates into the internal microstructure of the carbon black to cause oxidation. In this case, in order to relieve structural stress of the microstructure of the primary particle which has a radius of curvature greater than a radius of curvature of a surface of the spherical primary particle, an oxidation reaction occurs rapidly in the primary particle. Accordingly, internal carbon atoms are oxidized to gases such as CO, $CO_2$, and $CH_4$, and the primary particles are converted to a hollow type. Most of the structural stresses remaining in the spherical primary particles are also relieved while a surface structure of the hollow-type primary particles is also destroyed by the continuous oxidation treatment, and graphene sheets appear in this process. Thus, the modification process may be accelerated as the average diameter of the carbon black, as the primary particle, is decreased, internal density of the particle is decreased, and an amount of the oxygen functional group in the primary particle is greater than that on the surface of the primary particle. Also, step a is more desirable than step b in terms of the fact that step a may further accelerate the modification process.

The second particles may be carbon nanotubes. The second particle is the same as the second particle of the above-described embodiment.

The second particles may be prepared by dispersing bundle type or entangled type carbon nanotubes in a state of a dispersion. The expression "bundle type carbon nanotubes" denotes a secondary shape in the form of a bundle or rope in which a plurality of carbon nanotubes are aligned side by side in substantially the same orientation as a longitudinal axis of the carbon nanotube. The expression "entangled type carbon nanotubes" denotes that a plurality of carbon nanotubes are entangled with each other.

Thereafter, a step of mixing the first particles and the second particles is performed. The first particles and the second particles may be mixed by mixing a first particle dispersion containing the first particles and a second particle dispersion containing the second particles. The mixing may be performed during the preparation of the electrode slurry for forming an electrode.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Preparation Example 1: Preparation of First Particles (1) Formation of Preliminary First Particles (Acetylene Black)

Acetylene black was formed by pyrolysis of acetylene gas having a purity of 98% by instantaneously injecting the acetylene gas into a reaction furnace with an internal temperature of 2,000° C.

(2) Preparation of First Particles

Figure 2:
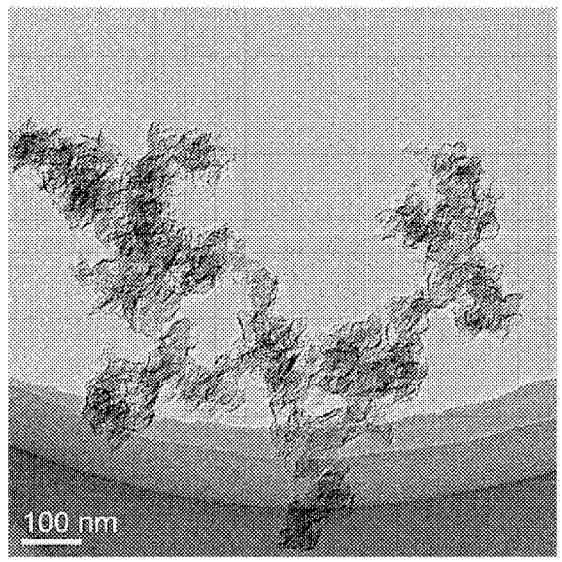
FIG. 2 is TEM and scanning TEM (STEM) images of first particles of Preparation Example 1.
Figure 2:
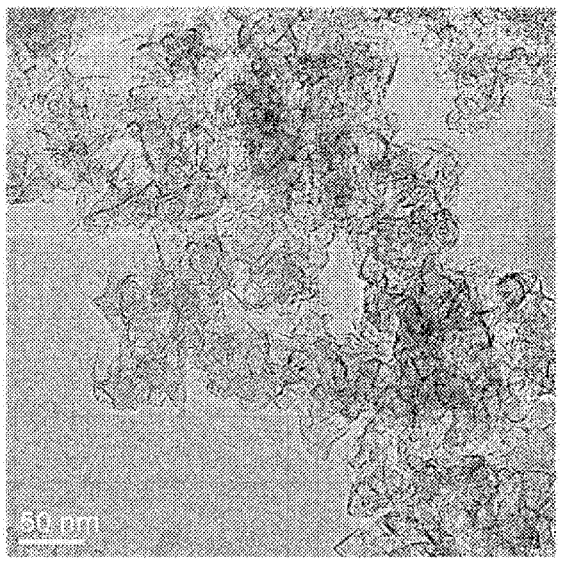
Figure 2:
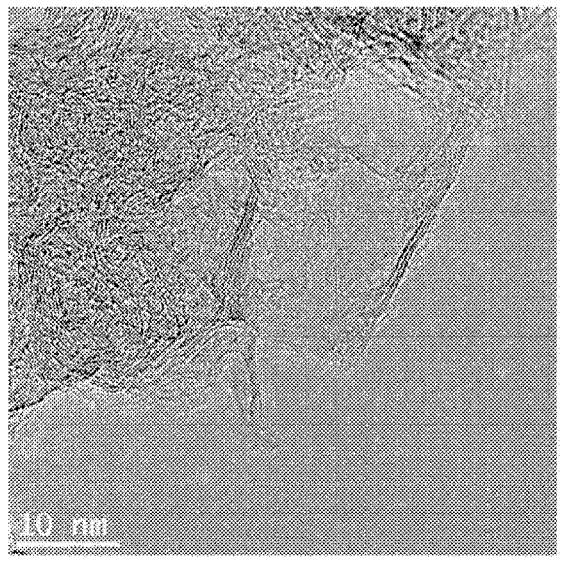
Figure 2:
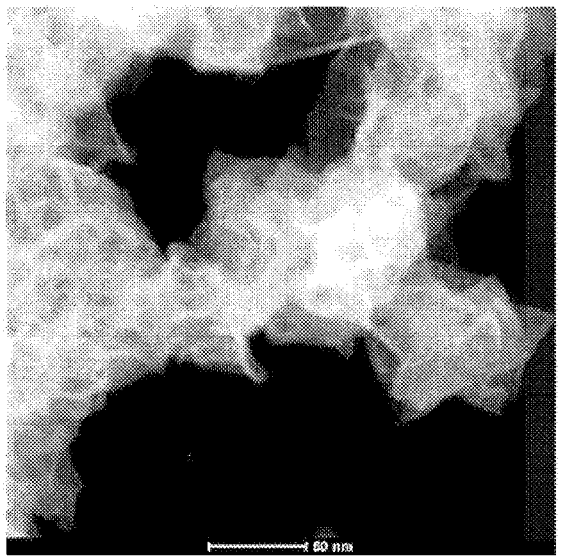
Figure 3:
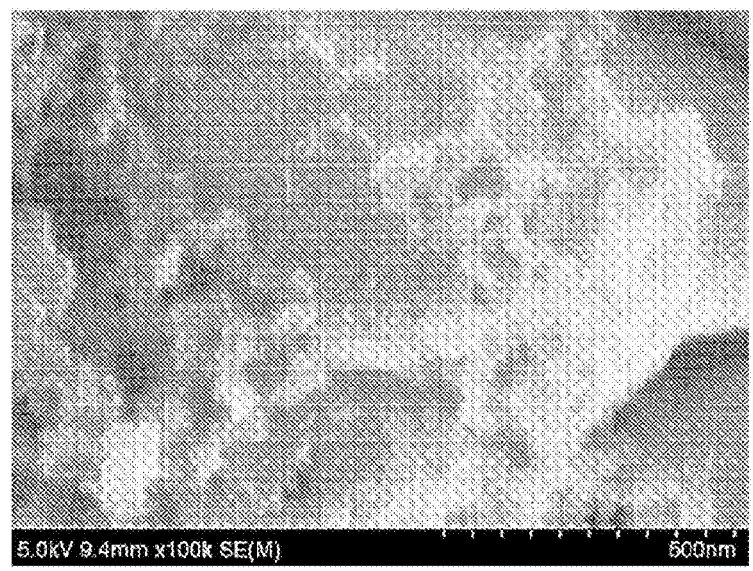
FIG. 3 is an SEM image of the first particles of Preparation Example 1.

Subsequently, the internal temperature of the reaction furnace containing the acetylene black was set to 250° C., and an oxidation treatment was then performed for 30 hours while introducing oxygen. As a result, first particles having a secondary particle structure, which included a chain shape in which a plurality of graphene sheets having a lateral size of about 40 nm were connected to each other, wherein the graphene sheets included a plurality of graphene sheets arranged in different directions, were obtained. (see FIGS. 2 and 3)

Preparation Example 2: Preparation of First Particles

Figure 4A:
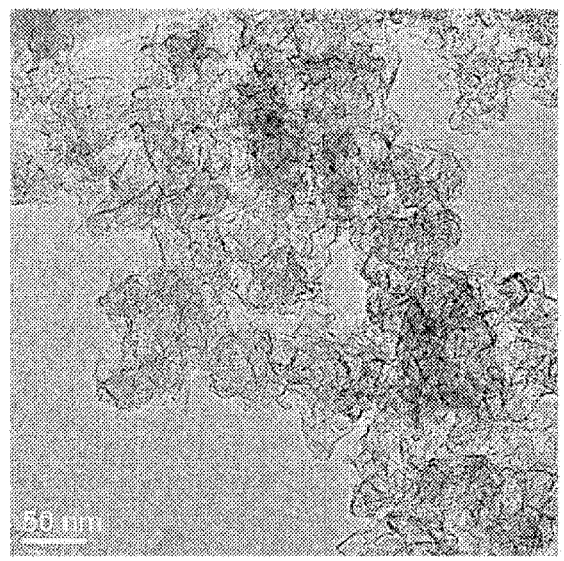
FIG. 4(*a*) is a TEM image of the first particles of Preparation Example 1 and FIG. 4(*b*) a TEM image of first particles of Preparation Example 2.
Figure 4B:
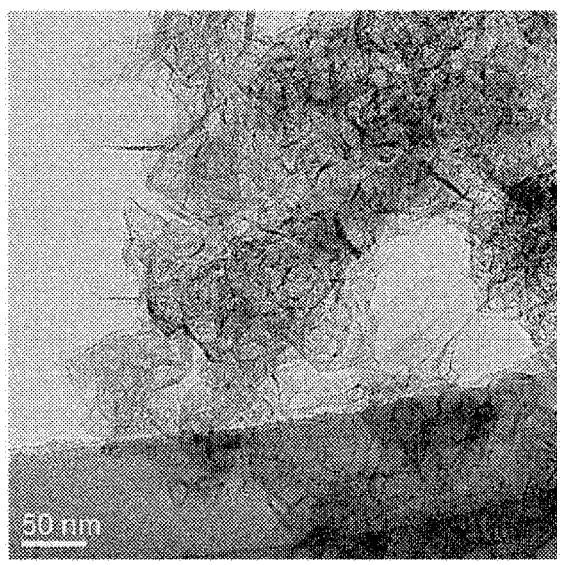

An additional heat treatment was performed on the conductive agent obtained in Preparation Example 1 at 900° C. for 1 hour in an inert atmosphere to obtain first particles having a secondary particle structure which included a chain shape in which a plurality of graphene sheets having a lateral size of about 65 nm were connected to each other, wherein the graphene sheets included a plurality of graphene sheets arranged in different directions. Referring to FIG. 4, it may be understood that the first particles of Preparation Example 1 illustrated in FIG. 4(*a*) were modified to the first particles of Preparation Example 2 of FIG. 4(*b*) by the heat treatment. Specifically, it may be understood that, since the adjacent graphene sheets are interconnected by the heat treatment, the lateral size was increased.

Example 1: Preparation of Battery (1) Preparation of First Particle Dispersion

The first particles of Preparation Example 1, a hydrogenated nitrile butadiene rubber (H-NBR) as a dispersant, and N-methylpyrrolidone (NMP), as a dispersion medium, were mixed at a weight ratio of 5.7:1.7:92.6 to prepare a mixture. The mixture was added to a spike mill, in which 80% was filled with beads having a diameter of 0.65 mm, dispersed, and discharged at a discharge rate of 2 kg/min. This process was performed 4 times to prepare a first particle dispersion containing the first particles with a controlled particle size distribution.

(2) Preparation of Second Particle Dispersion

Bundle type multi-walled carbon nanotubes, a hydrogenated nitrile butadiene rubber (H-NBR) as a dispersant, and N-methylpyrrolidone (NMP), as a dispersion medium, were mixed at a weight ratio of 4:0.8:95.2 to prepare a mixture. The mixture was added to a spike mill, in which 80% was filled with beads having a diameter of 0.65 mm, dispersed, and discharged at a discharge rate of 2 kg/min. This process was performed twice to prepare a second particle dispersion containing the second particles (carbon nanotubes) with a controlled particle size distribution.

(3) Preparation of Positive Electrode Slurry $Li[Ni_{0.6}Mn_{0.2}Co_{0.2}]O_2$ as a positive electrode active material, polyvinylidene fluoride (PVdF) as a binder, the first particle dispersion, the second particle dispersion, and NMP, as a solvent, were mixed and stirred to prepare a positive electrode slurry having a solid content of 72%. A weight ratio of the positive electrode active material, the PVdF, the first particles of Preparation Example 1, and the second particles in the positive electrode slurry was 96.5:1.5:0.8:1.2.

(4) Positive Electrode Preparation

A 20 μm thick positive electrode collector (Al) was coated with the positive electrode slurry so that a solid loading amount was 21 mg/cm$^2$ and dried. Thereafter, the positive electrode collector on which the positive electrode slurry was disposed was rolled by a roll rolling method such that a total thickness of the positive electrode slurry and the positive electrode collector was 77 μm. Thereafter, the positive electrode slurry and the positive electrode collector were dried at 130° C. for 6 hours to prepare a positive electrode.

(5) Secondary Battery Preparation

Figure 7:
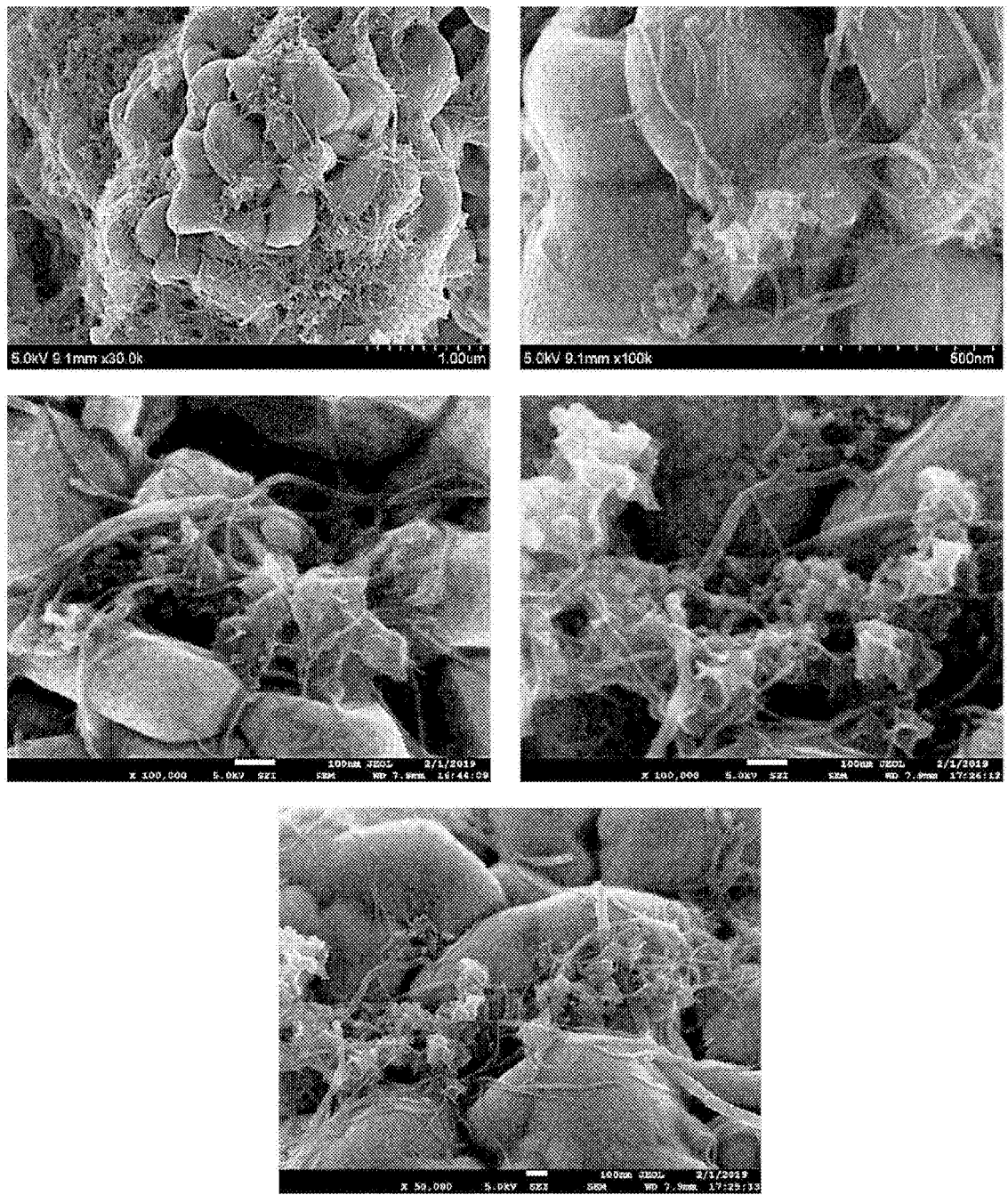
FIG. 7 is SEM images of a positive electrode of Example 1.

Artificial graphite as a negative electrode active material, carbon black as a negative electrode conductive agent, a styrene-butadiene rubber (SBR) as a negative electrode binder, and carboxymethyl cellulose (CMC) were mixed in distilled water at a weight ratio of 96.1:0.5:2.3:1.1 to prepare a negative electrode slurry. A 20 μm thick negative electrode collector (Cu) was coated with the prepared slurry so that a loading amount was 10 mg/cm$^2$ and dried. Thereafter, the negative electrode collector on which the negative electrode slurry was disposed was rolled by a roll rolling method such that a total thickness of the negative electrode slurry and the negative electrode collector was 80 μm. Thereafter, the negative electrode slurry and the negative electrode collector were dried at 110° C. for 6 hours to prepare a negative electrode (see FIG. 7).

Thereafter, after a mono-cell was prepared by combining the above-prepared negative electrode and positive electrode with a 15 μm thick polyethylene-based separator disposed therebetween, an electrolyte solution (ethylene carbonate (EC)/ethylmethyl carbonate (EMC)=1/2 (volume ratio)) and lithium hexafluorophosphate (1 M LiPF$_6$) were injected into the mono-cell to prepare a lithium secondary battery.

Example 2: Preparation of Battery

A battery was prepared in the same manner as in Example 1 except that the weight ratio of the positive electrode active material, the PVdF, the first particles of Preparation Example 1, and the second particles was 96.5:1.5:0.2:1.8 during the preparation of the positive electrode slurry.

Example 3: Preparation of Battery

A battery was prepared in the same manner as in Example 1 except that the weight ratio of the positive electrode active material, the PVdF, the first particles of Preparation Example 1, and the second particles was 96.5:1.5:1.8:0.2 during the preparation of the positive electrode slurry.

Example 4: Preparation of Battery

A battery was prepared in the same manner as in Example 1 except that the first particles of Preparation Example 2, instead of the first particles of Preparation Example 1, were used during the preparation of the positive electrode slurry.

Comparative Example 1: Preparation of Battery (1) Preparation of Positive Electrode Slurry Li(Ni$_{0.6}$Mn$_{0.2}$Co$_{0.2}$)O$_2$ as a positive electrode active material, polyvinylidene fluoride (PVdF) as a binder, a first particle dispersion (same as the first particle dispersion used in Example 1), and NMP, as a solvent, were mixed and stirred to prepare a positive electrode slurry having a solid content of 72%. A weight ratio of the positive electrode active material, the PVdF, and the first particles of Preparation Example 1 in the positive electrode slurry was 96.5:1.5:2.0.

(2) Preparation of Battery

A battery was prepared in the same manner as in Example 1 except that the above positive electrode slurry was used.

Comparative Example 2: Preparation of Battery (1) Preparation of Positive Electrode Slurry Li(Ni$_{0.6}$Mn$_{0.2}$Co$_{0.2}$)O$_2$ as a positive electrode active material, polyvinylidene fluoride (PVdF) as a binder, a second particle dispersion (same as the second particle dispersion used in Example 1), and NMP, as a solvent, were mixed and stirred to prepare a positive electrode slurry having a solid content of 72%. A weight ratio of the positive electrode active material, the PVdF, and the second particles in the positive electrode slurry was 96.5:1.5:2.0.

(2) Preparation of Battery

A battery was prepared in the same manner as in Example 1 except that the above positive electrode slurry was used.

Comparative Example 3: Preparation of Battery

Figure 5:
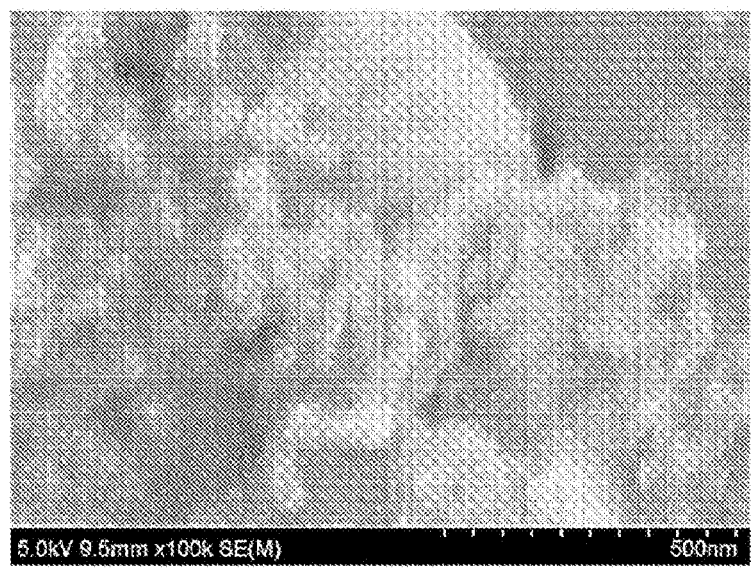
FIG. 5 is an SEM image of carbon black used in Comparative Examples.

A battery was prepared in the same manner as in Example 1 except that the first particles and the second particles were not used and carbon black (see FIG. 5) having an average particle diameter (D$_{50}$) of 23 nm was used as a conductive agent. In this case, a weight ratio of the positive electrode active material in the positive electrode, the PVdF, and the carbon black was 96.5:1.5:2.0.

Comparative Example 4: Preparation of Battery

Figure 6A:
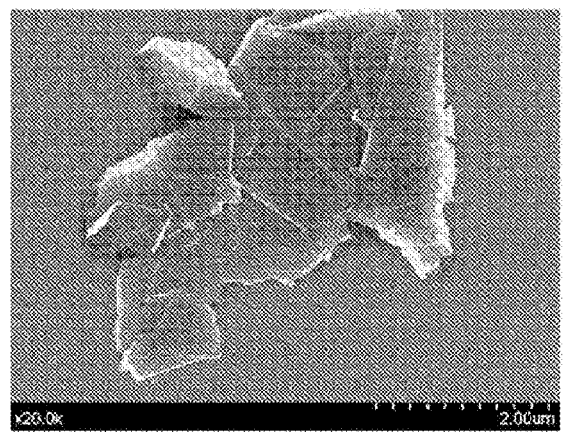
FIG. 6(*a*) is SEM images of graphene used in Comparative Examples of the present invention and FIG. 6(*b*) a positive electrode using the graphene.
Figure 6B:
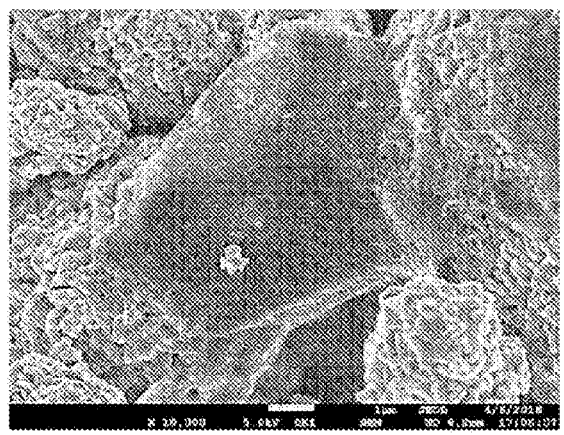

A battery was prepared in the same manner as in Example 1 except that the first particles and the second particles were not used and graphene (BTR New Energy Materials, Inc.) (see FIG. 6) having an average thickness of greater than 100 nm and an average size of 5.5 μm was used as a conductive agent. In this case, a weight ratio of the positive electrode active material in the positive electrode, the PVdF, and the graphene was 96.5:1.5:2.0. The average thickness and the average size were calculated as averages of 100 graphenes which were observed by an SEM or TEM.

Comparative Example 5: Preparation of Battery

A battery was prepared in the same manner as in Example 1 except that carbon black was used instead of the first particles. In this case, a weight ratio of the positive electrode active material in the positive electrode, the PVdF, the carbon black, and the carbon nanotubes (second particles) was 96.5:1.5:0.8:1.2.

Comparative Example 6: Preparation of Battery

A battery was prepared in the same manner as in Example 1 except that graphene (BTR New Energy Materials, Inc.) having an average thickness of greater than 100 nm and an average size of 5.5 μm was used instead of the first particles. In this case, a weight ratio of the positive electrode active material in the positive electrode, the PVdF, the graphene, and the carbon nanotubes (second particles) was 96.5:1.5:0.8:1.2.

Hereinafter, physical properties of the conductive agents (the first particles of Preparation Examples 1 and 2, respectively, the carbon nanotubes, the carbon black, and the graphene) used in Examples 1 to 4 and Comparative Examples 1 to 6 were evaluated and presented in Tables 1 to 5. Specifically, the physical properties were evaluated by the following methods.

1) Lateral size (nm) of the graphene sheet included in the first particle: after sizes of 100 graphene sheets included in the first particle in the positive electrode were measured with a TEM (JEOL, JEM-2010F), it was evaluated as an average of the sizes.

2) Lateral size of graphene: after sizes of 100 graphene sheets included in the positive electrode were measured with the TEM (JEOL, JEM-2010F), it was evaluated as an average of the sizes.

3) Nitrogen adsorption specific surface area ($m^2/g$): it was measured by degassing at 200° C. for 8 hours and performing $N_2$ adsorption/desorption at 77K using a BET measurement instrument (BEL-SORP-MAX, Nippon Bell).

4) Iodine adsorption value (mg/g): it was measured according to ASTM D1510.

5) Oxygen content (wt %): amounts of C, H, and N elements were measured by an elemental analyzer (CHN-coder MT-5, Yanako), and the oxygen content (differential) was calculated to reflect an amount of residual ash.

6) Raman spectrum D/G ratio: it was measured by analyzing a Raman spectrum obtained using an Ar-ion laser with a wavelength of 514.5 nm by a Raman spectrometer (NRS-2000B, Jasco).

7) Average particle diameter of carbon black: after first particle diameters of 100 carbon black particles in the positive electrode were measured with the TEM (JEOL, JEM-2010F), it was evaluated as an average of the diameters.

TABLE 1

| | Lateral size of graphene sheet (nm) | Nitrogen adsorption specific surface area ($m^2/g$) | Iodine adsorption value (mg/g) | Oxygen content (wt %) | Raman spectrum D/G ratio |
|---|---|---|---|---|---|
| First particles of Preparation Example 1 | 41 | 825 | 849 | 8.9 | 1.42 |
| First particles of Preparation Example 2 | 65 | 712 | 736 | 3.2 | 1.27 |

TABLE 2

| | Average diameter (nm) | Average length (μm) | Specific surface area ($m^2/g$) |
|---|---|---|---|
| Carbon nanotubes | 12 | 15 | 184 |

TABLE 3

| | Average particle diameter (μm) | Specific surface area ($m^2/g$) |
|---|---|---|
| Carbon black | 23 | 135 |

TABLE 4

| | Average thickness (nm) | Average size (μm) | Nitrogen adsorption specific surface area ($m^2/g$) | Oxygen content (wt %) | Raman spectrum D/G ratio |
|---|---|---|---|---|---|
| Graphene | Greater than 100 | 5.5 | 50 | Less than 1.0 | 0.15 |

Experimental Example 1: Evaluation of Discharge Capacity According to Discharge C Rate Results of evaluating the lithium secondary batteries prepared in Examples 1 to 4 and Comparative Examples 1 to 6 for each discharge C-rate are presented in Table 5. Specifically, a charge C-rate was fixed at 0.2 C, and 2.0 C discharge capacity (%) relative to 0.2 C discharge capacity was evaluated while increasing the discharge C-rate from 0.2 C to 2.0 C.

TABLE 5

| | 2.0 C discharge capacity relative to 0.2 C discharge capacity (%) |
|---|---|
| Example 1 | 94.6 |
| Example 2 | 92.8 |
| Example 3 | 90.5 |
| Example 4 | 96.1 |
| Comparative Example 1 | 83.9 |
| Comparative Example 2 | 87.4 |
| Comparative Example 3 | 75.2 |
| Comparative Example 4 | 68.3 |
| Comparative Example 5 | 88.2 |
| Comparative Example 6 | 89.7 |

According to Table 5, it may be understood that rate capabilities of the examples, in which the first particles and the second particles (carbon nanotubes) were used together, were significantly better than those of the comparative examples in which the first particles and the second particles (carbon nanotubes) were not used together. Also, it may be understood that the rate capability of Example 1, in which the weight ratio of the first particles to the second particles satisfied 2:8 to 5:5, was higher than those of Examples 2 and 3 in which the weight ratio of the first particles to the second particles was outside the above range.

Furthermore, it may be understood that the rate capability of Example 4, in which the first particles containing the graphene sheets having a larger lateral size were used, was higher than that of Example 1.

The invention claimed is:
1. An electrode comprising:
a conductive agent comprising a first particle and a second particle,
wherein the first particle comprises a secondary particle structure in which graphene sheets are connected to each other,
the first particle comprises a plurality of graphene sheets arranged in different directions, the second particle is a carbon nanotube, wherein a weight ratio of the first particles to the second particle ranges from 2:8 to 5:5, and wherein the plurality of graphene sheets have a lateral size of 10 nm to 200 nm.

2. The electrode of claim 1, wherein an oxygen content of the first particle is in a range of 1 wt % to 10 wt % based on a total weight of the first particle.

3. The electrode of claim 1, wherein the first particle has a D/G peak ratio of 0.9 to 2.0 during Raman spectrum measurement.

4. The electrode of claim 1, wherein the first particle has a value calculated by Equation 1 of 0 to 0.2:

$$\frac{|b-a|}{a} \quad \text{[Equation 1]}$$

wherein, in Equation 1, a is a specific surface area ($m^2/g$) of the first particle which is measured by a nitrogen adsorption Brunauer-Emmett-Teller (BET) method, and b is an iodine adsorption value (mg/g) of the first particle.

5. The electrode of claim 1, further comprising a connection portion connected to at least a part of the graphene sheets of the plurality of graphene sheets, wherein the connection portion has a non-graphene shape.

6. The electrode of claim 5, wherein at least a portion of each of the plurality of graphene sheets is connected to the connection portion.

7. The electrode of claim 1, wherein the plurality of graphene sheets have an average thickness of 0.34 nm to 10 nm.

8. The electrode of claim 1, wherein the first particle has a specific surface area ($m^2/g$) measured by a nitrogen adsorption BET method of 200 $m^2/g$ to 1,100 $m^2/g$.

9. The electrode of claim 1, wherein the carbon nanotube has an average diameter of 1 nm to 200 nm.

10. The electrode of claim 1, wherein the carbon nanotube is a multi-walled carbon nanotube.

11. The electrode of claim 1, wherein the carbon nanotube has an average length of 0.1 μm to 100 μm.

12. A secondary battery comprising:
a positive electrode;
a negative electrode;
a separator disposed between the positive electrode and the negative electrode; and
an electrolyte,
wherein at least one of the positive electrode and the negative electrode is the electrode of claim 1.

* * * * *